UNITED STATES PATENT OFFICE.

WILLIAM R. WALKER, OF NEW YORK, N. Y.

PROCESS OF MAKING ACID-STEEL.

1,309,496.     Specification of Letters Patent.     Patented July 8, 1919.

No Drawing.     Application filed February 1, 1918. Serial No. 214,834.

*To all whom it may concern:*

Be it known that I, WILLIAM R. WALKER, a citizen of the United States, residing in the city, county, and State of New York, have invented certain new and useful Improvements in Processes of Making Acid-Steel, of which the following is a specification.

My invention aims to provide a process of producing high grade acid steel which in very low in phosphorus and sulfur and in which practically or nearly all the oxids and slag and other impurities are removed when the product is finally finished. The product when finished will correspond with the very high grade Swedish acid or crucible steel and can be produced at a comparatively low cost for such material.

According to my invention the iron is bessemerized in an acid converter to eliminate all or nearly all the silicon contained therein and to reduce the carbon to a substantially low percentage, preferably to 0.5%.

The metal is then transferred to a basic open hearth and there treated in the usual way to eliminate practically or nearly all of the phosphorus contained therein. The slag used at this stage of the process is the ordinary basic slag containing lime and iron oxid.

The metal is then transferred to a basic electric furnace and there is further treated to remove practically or nearly all of the sulfur and the remaining phosphorus contained therein. The basic slag used at this stage of the process is of a composition depending on the quality of the steel desired. If the steel is to be low in sulfur the slag must be highly basic and it would be desirable to have a certain determined percentage of silica, preferably from 10% to 12% of the total weight of the slag, the remainder of the slag being lime. If the steel is to be only moderately low in sulfur the slag would not be so basic, the certain determined percentage of silica preferred being from 25% to 35% of the total weight of the slag and the remainder of the slag being lime.

Or this basic electric furnace may be used solely or chiefly for removing oxids and sulfur, the open-hearth furnace having previously been operated so as to bring the phosphorus down to the desired limit. In either case the basic electric furnace will get out the oxids and sulphur.

The metal is again transferred to an electric furnace, but this time to an acid electric furnace with an acid lining, the lining being, for example, silica brick or silicious sand or both.

The finishing slag used at this last stage of the process is a silicious slag which varies, depending on the amount of silicon that is desired in the steel. I prefer to use a slag which contains a comparatively high percentage of silica and which contains enough lime to insure fluidity and is sufficiently low in lime to avoid seriously scorifying the lining of the electric furnace, (including with lime other basic materials such as magnesia or alumina for example,) thereby effecting considerable economy in the operation of the furnace and also effecting a considerable purifying effect on the metal, and thereby securing an improvement in the quality of the steel produced. A specific example of a suitable slag is 75 per cent. silica and 25 per cent. lime or basic equivalents. The prime purpose of this last electric furnace is to dead melt the steel, that is, to add silicon reduced from silica in slag and to remove the last traces of oxids and slag in the bath. This product would be very high grade on account of its being very low in phosphorus and sulfur, and would correspond with very high grade Swedish acid or crucible steel. The length of time in the last furnace would depend on the percentage of silicon desired in the product and time necessary to thoroughly remove oxids, slag, gases and other impurities.

Though I have described with great particularity in detail certain specific embodiments of my invention, yet it is not to be understood therefrom that the invention is restricted to the particular embodiments disclosed. Various other modifications thereof may be made by those skilled in the art without departing from the invention as defined in the following claims.

What I claim is:—

1. The process of producing acid steel, low in sulfur, which consists in bessemerizing iron in an acid converter, transferring the metal to and treating it in a basic open hearth, thereafter transferring it to and treating it in a basic electric furnace with a basic slag containing at least 10% silica and the remainder of the slag being lime, and thereafter transferring it to and treating it in an acid-lined electric furnace with a silicious slag.

2. The process of producing acid steel, moderately low in sulfur from pig iron fairly high in sulfur which consists in bessemerizing iron in an acid converter, transferring the metal to and treating it in a basic open hearth, thereafter transferring it to and treating it in a basic electric furnace with a basic slag containing approximately 25% to 35% silica and the remainder of the slag being lime, and thereafter transferring it to and treating it in an acid-lined electric furnace with a silicious slag.

In witness whereof, I have hereunto signed my name.

WILLIAM R. WALKER.